2 Sheets—Sheet 1.
C. G. GUSTAFSSON.
MACHINES FOR MAKING NUTS.
No. 176,222. Patented April 18, 1876.
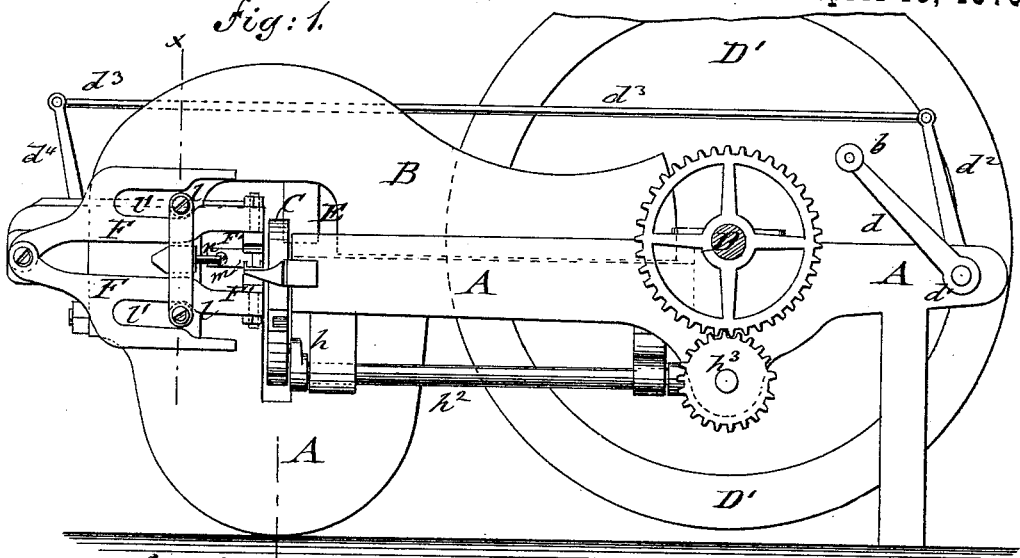
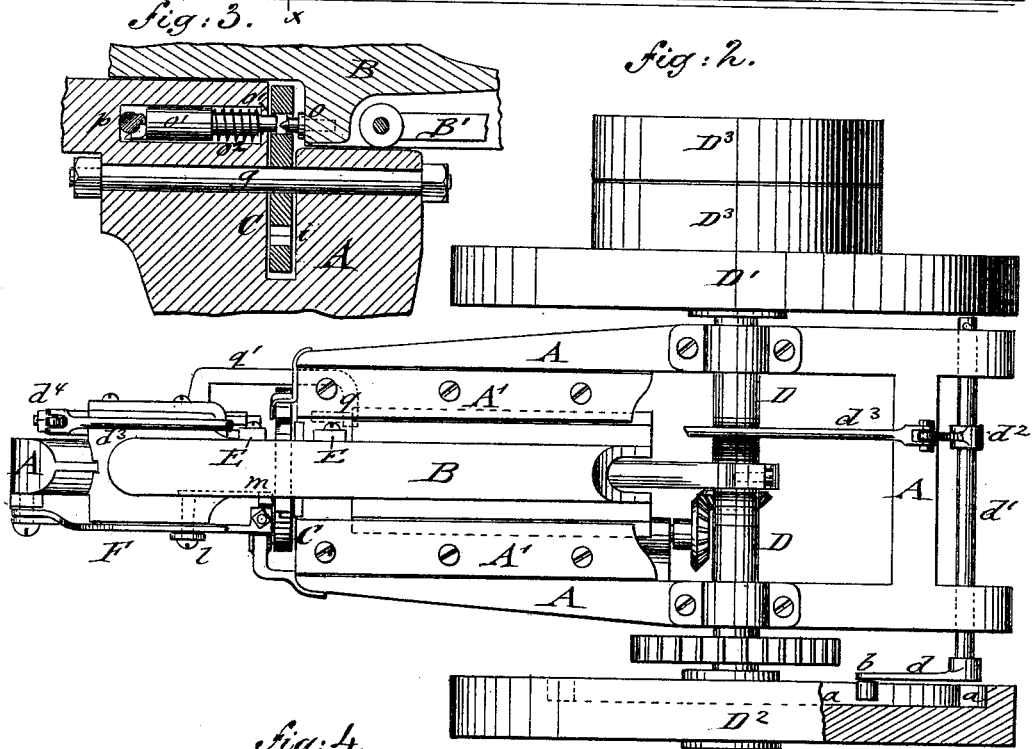
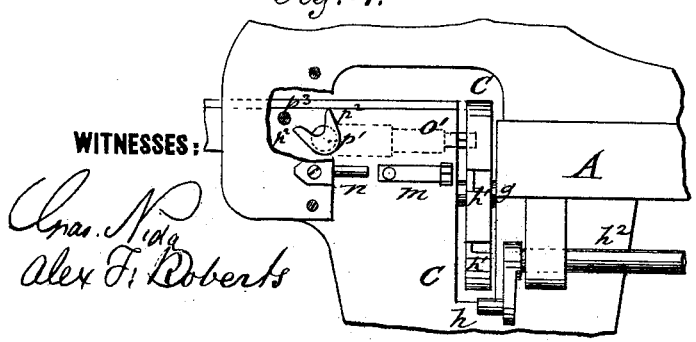
WITNESSES:
INVENTOR:
C. G. Gustafsson
BY
ATTORNEYS.
N. PETERS, PHOTO-LITHOGRAPHER, WASHINGTON, D.C.

2 Sheets—Sheet 2.
C. G. GUSTAFSSON.
MACHINES FOR MAKING NUTS.
No. 176,222. Patented April 18, 1876.
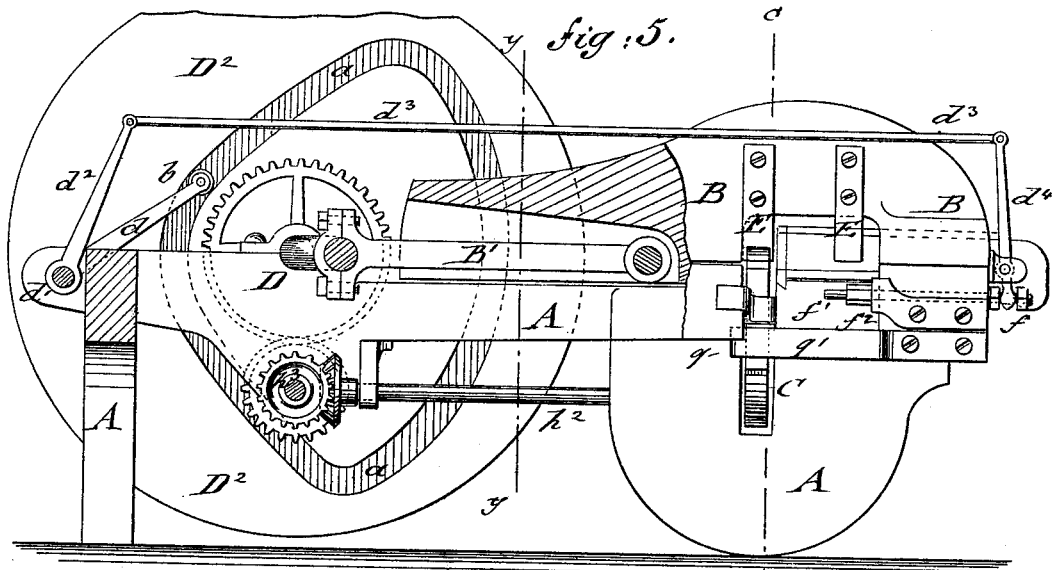
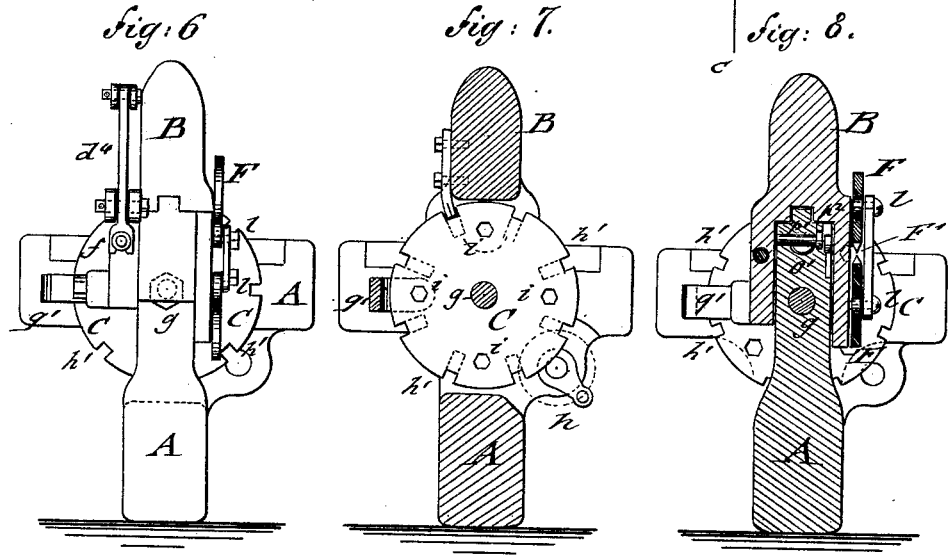
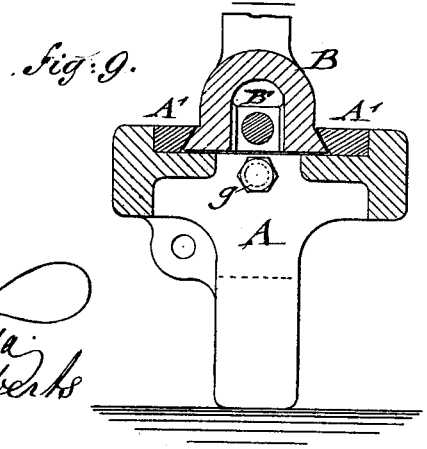
WITNESSES:
Chas. Nida
Alex F. Roberts
INVENTOR:
C. G. Gustafsson
BY
Munn
ATTORNEYS.

UNITED STATES PATENT OFFICE.

CARL G. GUSTAFSSON, OF JÖNKÖPING, SWEDEN.

IMPROVEMENT IN MACHINES FOR MAKING NUTS.

Specification forming part of Letters Patent No. 176,222, dated April 18, 1876; application filed December 4, 1875.

*To all whom it may concern:*

Be it known that I, CARL GUSTAF GUSTAFSSON, of Jönköping, Sweden, have invented a new and Improved Machine for Making Screw-Nuts, of which the following is a specification:

In the accompanying drawing, Figure 1 represents a side elevation of my improved machine for making screw-nuts; Fig. 2, a plan view of the same; Fig. 3, a detail vertical section of the machine, taken on the longitudinal axis, to show die-wheel and punches. Fig. 4 is a detail side view of the disk and punching devices. Fig. 5 is a sectional elevation of the machine, showing opposite side; Fig. 6, an end view; and Figs. 7, 8, and 9 are vertical transverse sections of the machine, respectively on the lines $c\ c$, Fig. 5, $x\ x$, Fig. 1, and $y\ y$, Fig. 5.

Similar letters of reference indicate corresponding parts.

The invention relates to an improved machine for making screw-nuts of hexagonal and other shapes in rapid and effective manner; and it consists of an intermittently-revolving disk with dies, into which the nut-blanks, cut by shears from the bar, are fed and brought by consecutive punches into the required shape.

In the drawing, A represents a solid main standard or base frame of elongated shape, supported on suitable pillars.

A strong slide-piece, B, is moved in guides $A'$ by a connecting-rod, $B'$, and double crank-shaft, D, which is provided at the ends with fly-wheels $D^1$ and $D^2$, and fast and loose belt-pulleys $D^3$, by which motion is imparted to the double crank-shaft, as shown in Fig. 2.

One of the fly-wheels, $D^2$, is provided with a cam-groove, $a$, which engages the roller $b$ of a lever, $d$, keyed to a shaft, $d^1$, of frame A, to which also a second lever-arm, $d^2$, is rigidly applied. Lever $d^2$ is connected by a rod, $d^3$, that extends in longitudinal direction above the slide-piece B to the front part of the same, and pivoted to a fulcrumed lever, $d^4$, that engages a punch, $f^1$, socket $f^2$, of the exact shape of the nuts to be produced in the machine, being rigidly attached to the slide-piece B.

A disk, C, is arranged in lateral direction in a recess of main frame A, and placed loosely on a central bolt, $g$, screwed to frame A, for the purpose of being readily turned thereon by a crank, $h$, at the end of a longitudinal crank-shaft, $h^2$, which is revolved at double the speed of the main shaft D by bevel-wheels of a second shaft, $h^3$, below the main shaft, which transmits motion to the auxiliary shaft by intermeshing gear-wheels.

The crank $h$ enters recesses or notches $h^1$ at the circumference of the disk C, and imparts thereby intermittent rotary motion to the same, carrying the disk at each revolution of the crank-shaft through one-eighth of its revolution.

The disk C is arranged with four die-holes and dies, $i$, of the shape of the nuts to be formed on the machine, said dies being equidistant from the center of the disk and from each other, at points intermediately between two adjoining circumferential recesses.

Vertical lock-pieces E, attached to one side of the slide B, enter, at the forward and return stroke of the slide, the notches of the disk at the instant when one-eighth part of its revolution is completed, and serve to stop and securely retain the disk in position until, by the motion of the disk-actuating crank and the simultaneous motion of the slide-piece, the lock-pieces are withdrawn, and the disk moved forward through another eighth part of its revolution.

To the front end of main standard A are pivoted the shear-levers F, which are operated by rollers $l$ of the slide-piece entering slotted recesses $l'$ of the shear-levers, so as to open and close the same, and produce, by the approach of the steel shears $F'$, the cutting off of a nut-blank from the heated bar, fed sidewise over suitable guides or rests to the same, simultaneous with the reciprocating strokes of the slide-piece. The heated bar is pushed in against a gage-spring, $m$, which is pressed back by the blank cut off by the shears. The gage-spring has a jaw or socket-shaped end, which takes up the blank sheared off, and retains it for the action of the punch $n$, that carries the blank into one of the nut-dies of the disk C.

The shearing off and inserting of the blank into the die of the disk is accomplished by the return stroke of the slide-piece, the forward stroke imparting to the disk one-eighth of a turn, and bringing the nut-blank before a pointed punch, $o$, (shown in Fig. 3,) while the disk is secured in position by the front locking-piece E for the action of the punches. Before punch $o$ reaches the nut-blank a sliding punch, $o^1$, at the opposite side of the disk, is thrown forward by the action of a cam, $p$, on its rear end, cam $p$ being placed on a short shaft, $p^1$, that is operated alternately to act on or release the sliding punch $o^1$ by end arms $p^2$, engaged by an actuating-pin, $p^3$, of the slide-piece B, as shown in Fig. 4. As soon as the cam $p$ releases the punch $o^1$, a spiral spring, $o^2$, withdraws the same instantly from the disk, to admit the next turning of the disk. The punch $o^1$ enters the disk slightly, and forms there an abutting seat, against which the nut-blank is forced by the action of the punch $o$, which is of smaller diameter and pointed partly, in order to make the hole in the blank with as little loss of material as possible, and partly in order to expand the blank so that it fills up the die. The return stroke of the slide B and the next turning and locking of the disk expose the nut-blank to the action of the socket $f^2$, which presses against the blank and holds it for the advancing punch $f^1$, operated by the cam-grooved fly-wheel $D^2$.

The punch $f^1$ completes the hole in the nut and leaves the same in the die, as the socket $f^2$ prevents the nut from being carried back by the punch $f^1$. The next forward stroke of the slide and the next turn of the disk bring the nut in front of the clearer-punch $q$, attached to a curved arm, $q'$, of the slide, so that the nut is forced out of the disk and dropped into some receptacle, being perfectly formed while still in red-heated state. Each forward stroke clears a nut from the disk, while each return stroke supplies by the shears a new blank to the same, so that each complete revolution of the disk furnishes four finished screw-nuts.

The different punches are all made to act in consecutive order on each nut-blank as the same is exposed to them by the forward motion of the disk, all the punches being actuated simultaneously when the four disk-dies are continually supplied with blanks. The nuts are thus produced in a rapid and perfect manner by a compact and powerful machine, which is capable of great speed and productive capacity. The different power-transmitting mechanisms may be constructed in different ways, as I do not confine myself to the construction described. The machine may with equal facility be employed for making square, hexagon, or any other forms of nut, the dies and punches being merely arranged to correspond to the shape to be produced.

Having thus described my invention, I claim as new and desire to secure by Letters Patent—

1. The combination of the recessed pivoted shear-levers, having chisel-shaped cutters, with the operating-rollers of the slide-piece, substantially as set forth.

2. The combination of the spring-gage with the shears, having chisel-shaped cutters for retaining the sheared-off blank, substantially as shown and described.

3. The combination of the rotating disk, having shaping-dies, with a cam and spring acted socket-punch, and with a pointed punch at the opposite side for expanding and partly perforating the blanks, substantially as set forth.

4. The combination of the sliding and spring-acted holding-punch with a cam-shaft, having outer arms, operated by a pin of the slide-piece, to force the punch forward and permit the withdrawal of the same at the proper time, substantially as and for the purpose set forth.

The foregoing specification of my new and useful nut-making machine signed by me this 28th day of June, 1875.

CARL GUSTAF GUSTAFSSON.

Witnesses:
C. A. GROTH,
K. W. JOHANSEN.